Figure 1:
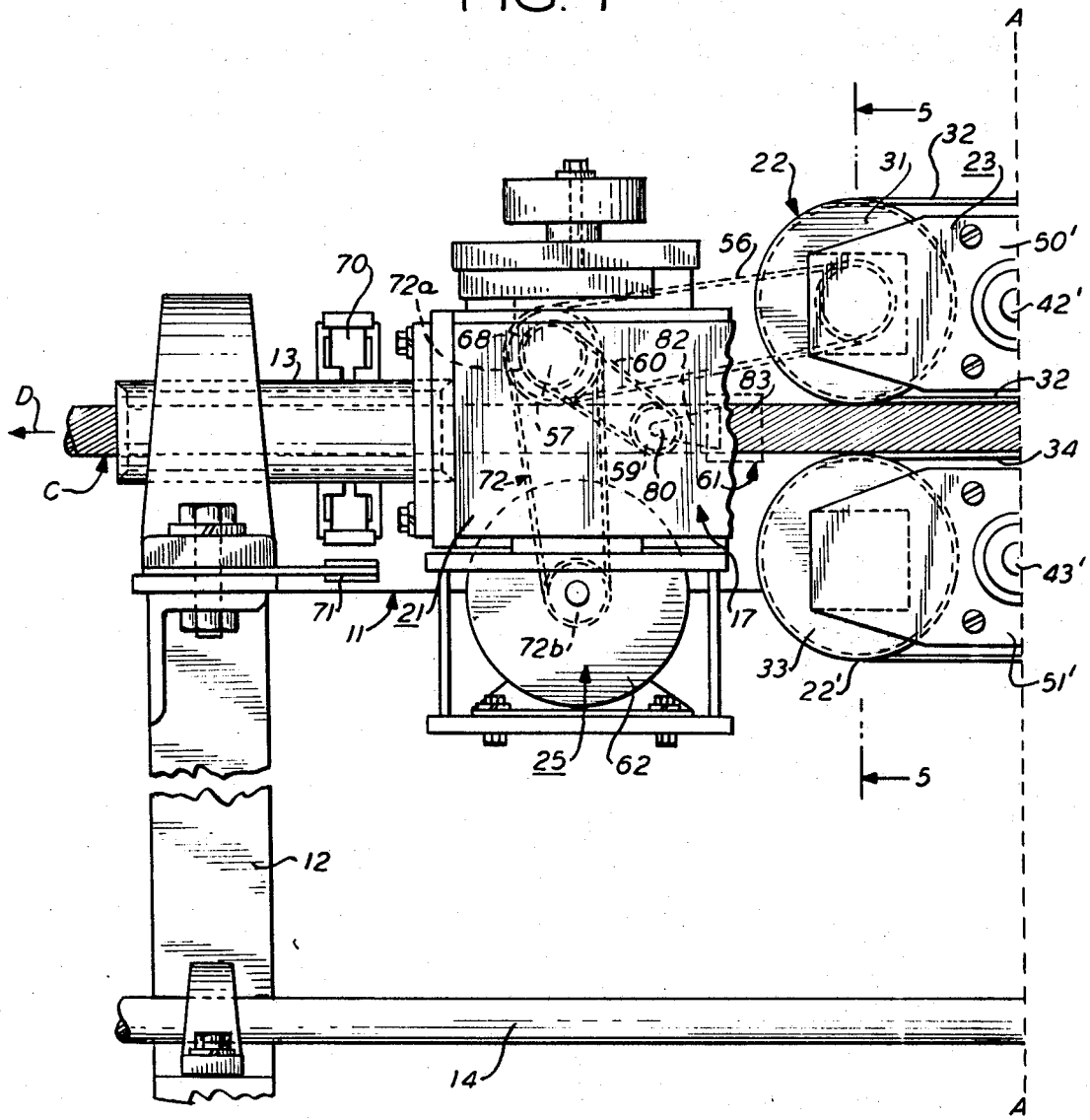

United States Patent

[11] 3,579,842

[72] Inventor Joseph William Scher
　　　　　　 Short Hills, N.J.
[21] Appl. No. 763,324
[22] Filed Sept. 27, 1968
[45] Patented May 25, 1971
[73] Assignee Weber & Scher Mfg. Co., Inc.
　　　　　　 Newark, N.J.

[54] CABLE-MEASURING MACHINE
　　　 11 Claims, 6 Drawing Figs.
[52] U.S. Cl. ................................................. 33/133,
　　　　　　　　　　　　　　　　　　　　　　　　　 33/129
[51] Int. Cl. .............................................. G01b 3/12
[50] Field of Search ....................................... 33/133,
　　　　　　　　　　　　　　　　　　 129, 130, 134, 131, 132

[56] References Cited
UNITED STATES PATENTS

| | | | |
|---|---|---|---|
| 2,494,732 | 1/1950 | Weber .......................... | 33/129 |
| 2,707,332 | 5/1955 | Smith ........................... | 33/134 |
| 2,711,026 | 6/1955 | Nelson et al. ................. | 33/129 |
| 3,318,005 | 5/1967 | Petersen ....................... | 33/129 |

Primary Examiner—William D. Martin, Jr.
Attorney—Sommers & Sommers

ABSTRACT: In a machine for the measurement of length of cable passing a given point, a rotating constant-pressure belt measuring unit which comprises structural features, including a rotatable measuring unit, maintaining a constant and continuing contact with the cable to accurately measure same without interfering with the movement of the cable through the machine.

INVENTOR
J. W. SCHER

Sommers & Sommers
BY ATTORNEYS

INVENTOR
J. W. SCHER

Sommers & Sommers
BY
ATTORNEYS

3,579,842

CABLE-MEASURING MACHINE

CABLE-MEASURING MACHINE

This invention relates to the measuring of length of cable passing a given point, and more particularly to a measuring machine having a rotatable measuring unit for so doing, without interfering with movement of the cable through the machine.

The rotatable measuring unit of this invention provides an accurate measurement of both the cable line speed and the footage of cable passing a given point, without interfering with the movement of the cable. Additionally, in the operation of stranding (i.e. twisting together the individual wires to form a finished cable) the machine performs its measuring function so as not to interfere with the twisting of the wires. Further, the measuring device can be clamped on the cable with a minimum and constant pressure so as not to distort or damage the cable. Still further, the measuring unit of the invention has the ability to compensate for variations in the cable diameter, while not following irregularities on the surface of the cable, thus enabling it to measure straight line length of the center of the cable rather than the length of irregular surfaces of the cable.

Devices proposed for this purpose heretofore have generally been objectionable due to their complexity and high cost of initial manufacture, and requirement for substantial maintenance. Further, in the stranding operation, fixed measuring unit machines employed heretofore required fixation at a position between the point where the individual strands were fixed, by means of a plate, to properly position them relative to each other, up to the point where the finished twisted cable was held; such fixation interfered with the stranding process. Objections to devices heretofore proposed have been eliminated in the cable-measuring machine of this invention.

Figure 2:
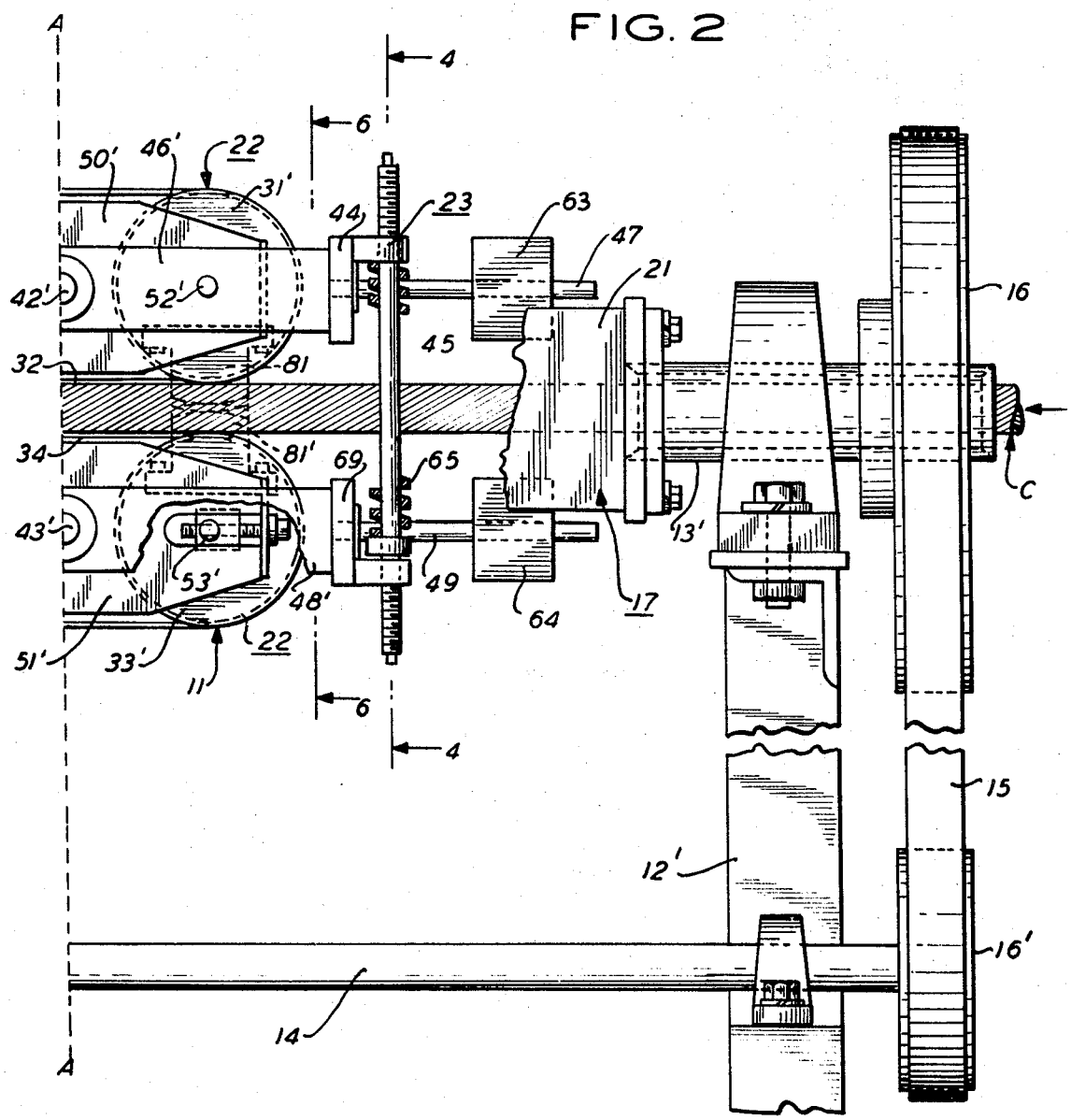
Figure 3:
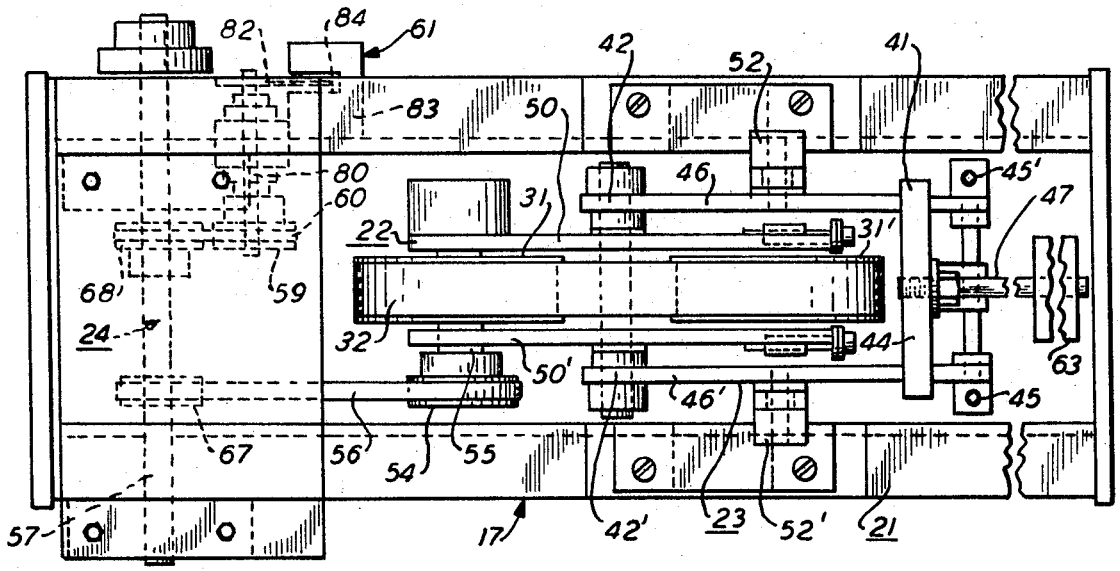
Figure 4:
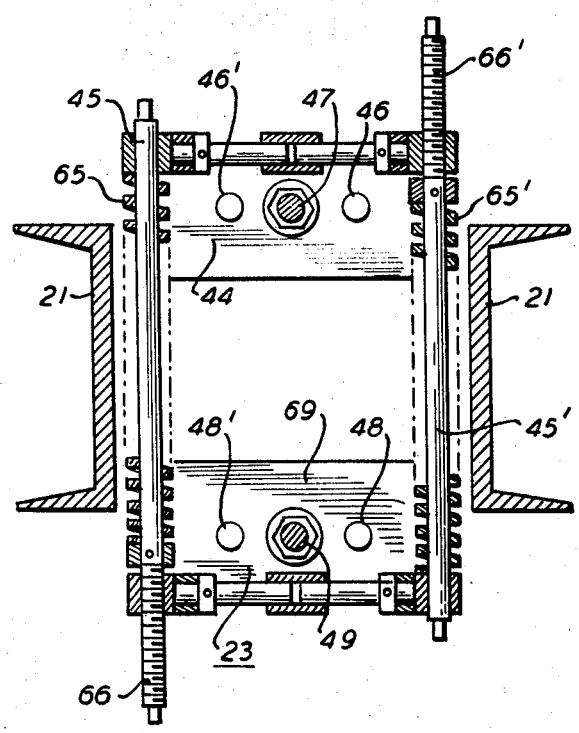
Figure 5:
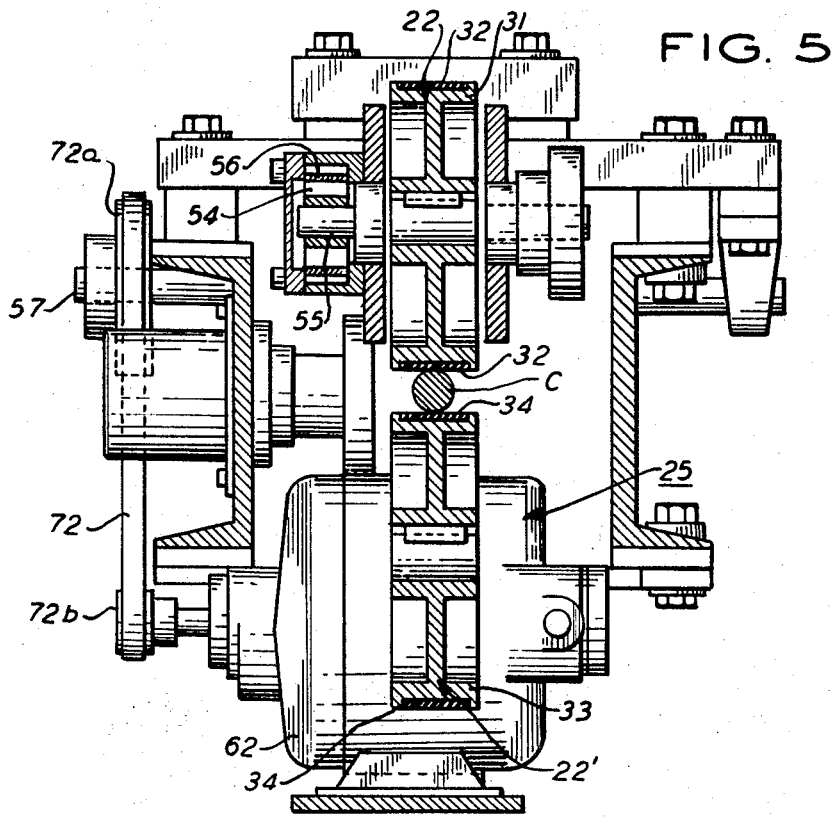
Figure 6:
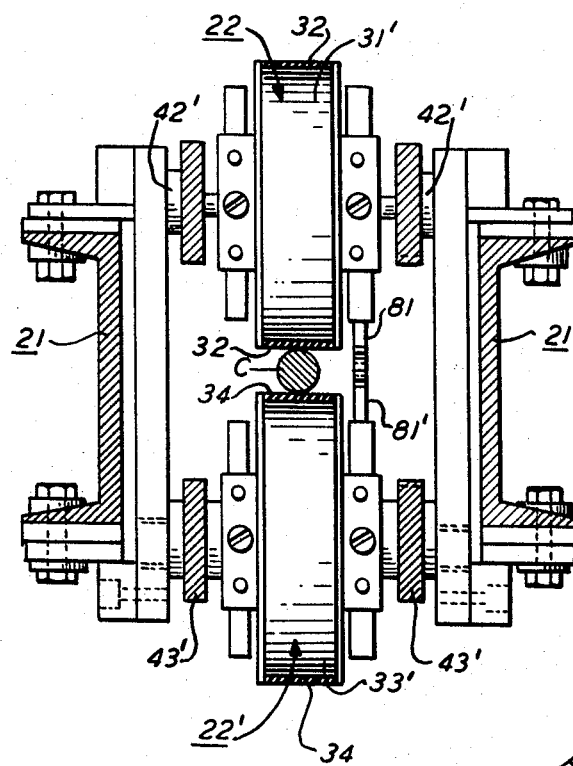

In the drawings, wherein similar characters indicate like parts:

FIG. 1 is a side, elevational, partly broken view, showing one portion of a side of a cable-measuring machine embodying the invention, to line A-A thereof, FIG. 2 is a similar view of the other portion of that side of the machine from line A-A thereof, FIG. 3 is a top plan view of a rotatable measuring unit embodying the invention, FIG. 4 is an elevational, partly sectional view, taken at line 4-4 of FIG. 2, FIG. 5 is a vertical elevational, partly sectional view, taken at line 5-5 of FIG. 1, and FIG. 6 is a vertical elevational, partly sectional view, taken at line 6-6 of FIG. 2.

As will be seen from the drawings, forming part hereof, this invention relates to a cable-measuring machine operating, as described below, with reference generally to FIGS. 1 and 2, so that the cable C, to be measured, is not interrupted or interfered with by the movement of the rotating measuring unit, while the rotating measuring unit functions accurately to gain a true measurement of the length of the cable passing through a given point and the line speed thereof.

The cable measuring machine 11 (FIGS. 1 and 2) is comprised of support members 12 and 12', bearing members 13 and 13', a drive shaft 14, a driver belt 15, driver pulleys 16 and 16' and a measuring unit 17 rotatably supported in the bearing members 13 and 13'. The drive shaft 14 is connected, on the end thereof adjacent the support 12, to a conventional drive means. The cable is taken up through the machine in a given direction for example, D, as shown in FIG. 1.

The rotatable measuring unit 17 (FIG. 3) comprises a housing member 21, belt means 22 and 22', pivoted support means 23, and means 24 connecting (as at 60, FIGS. 3, 1) with measuring means 25. The belt means 22 (FIGS. 1—3) includes upper pulleys 31 and 31' on which upper belt 32 is entrained and lower pulleys 33 and 33', in which is entrained lower belt 34. The pivoted support means 23 (FIGS. 1—4) comprises a central frame member 41 and (FIG. 3) upper pivots 42 and 42' thereon and lower pivots 43 and 43' thereon, and upper housing pivots 52 and 52' and lower housing pivots 53 and 53'. The central frame member 41 (FIG. 3) comprises upper central member 44 (FIG. 3) and lower central member 69 (FIG. 2) interconnected by bolt connectors 45 and 45' (FIG. 4). said bolt connectors 45 and 45' have spring members 65 and 65' and threaded bolt ends 66, 66' thereon. Extending from one (inner) face of upper central member 44 are (FIG. 3) upper outer frame arms 46 and 46'; from the other (outer) face of upper frame member 44 extends upper balance arm 47. Extending from one face of lower central member 69 are (FIG. 2) lower outer frame arms 48 and 48' and from the other face of the lower central member 69 extends lower balance arm 49 (FIG. 4). Upper balance weight 63 (FIGS. 2 and 3) is seated on upper balance arm 47 and lower balance weight 64 is seated on lower balance arm 49. The upper outer frame arms 46 and 46' (FIG. 3) have as at 42 and 42' pivotally mounted thereon upper inner frame arms 50 and 50'. The lower outer frame arms 48 and 48' (FIGS. 1 and 2) similarly have pivotally mounted thereon as at 43 and 43' lower inner frame arms 51 and 51'. The upper outer frame arms 46 and 46 are pivotally connected to the housing member 21 (FIG. 3) by upper bearings or housing pivots 52 and 52'. The lower outer frame arms 48 and 48' are pivotally connected (FIG. 2) to the housing member 21 by lower bearings or housing pivots 53 and 53'. The connection means 24 may comprise (FIGS. 1 and 3) connector pulley 54 (on upper shaft 55 to which is also keyed upper pulley 31) connector belt 56 and (FIG. 1) counter shaft 57, counter belt 60, pulley 59 and tachometer belt 72. The counter means 25 (FIG. 1) may comprise an impulse contractor 61 (FIGS. 1 and 3) comprising a rotatable arm member 82, and a block member 83 having an opening 84 therein for movement therethrough of arm member 82, thereby intermittently breaking the circuit in block member 83 and generating the signal as below described. Contactor 61 is remotely connected to a conventional electrical counter, and tachometer generator 62 is remotely connected to a line speed meter. Bearing member 13 (FIG. 1) is provided with a slipring 70. Slipring brush 71 is mounted on the support member 12.

In operation (FIGS. 1—3, for example) the cable C is taken up in a given direction by passing it through the bearing member 13' and through central axial opening in the rotatable measuring unit 17. Said opening may be adjusted by tightening or loosening the bolt connectors 45 or 45' (FIG. 4) thereby tensioning or loosening the spring members 65, 65', which act on the upper central member 44 and the lower central member 69.

In a machine rest position the upper belt 32 and the lower belt 34 are in direct contact with a substantial portion of the surface of cable C. On movement of the cable C in a takeup direction, the upper belt 32 moves about the upper pulleys (FIGS. and 31' and the lower belt 34 moves about the pulleys 33 and 33' and continuous contact occurs between the cable C and a substantial position of the upper belt 32 and lower belt 34. This continuous contact between the cable surface and a substantial portion of the belts to generate the signal averages out surface contact of the cable and the belts, and thus irregularities in the cable surface; accordingly a measurement is provided that is representative of the true centerline length of cable passing through the machine. The two gear segments 81 and 81' (FIGS. 2 and 6) interact to insure the equal and uniform adjustment of position of and therefore movement of the two belt means 22 and 22' relative to the centerline of cable C.

Rotation of the upper pulleys 31 and 31' (which is directly related to the movement of the cable C by continuous contact of the surface of cable C with a substantial portion of the upper belt 32) (FIG. 3) in turn equally rotates the connector pulley 54 which (FIG. 3) is keyed to the same upper shaft 55 as is the upper pulley 31. The connector belt 56 is thus moved as is the connector pulley 67 over which it is entrained and thereby the connector shaft 57 to which pulley 67 is keyed.

Fixed to the connector shaft 57 is the pulley 68 on which is entrained belt 60 which drives pulse counter shaft 80 to which is keyed rotatable arm member 82 of impulse contactor 61. A pulley 59 is keyed to shaft 80; belt 60 is entrained on pulley 59 and on pulley 68 of shaft 57. Belt and pulley means 72, 72a, 72b connect shaft 57 with tachometer generator generator 62. An impulse contactor 61 receives the signal reflected in the counter pulley 68 by means of the counter belt 60 and sends the signal by rotation of the rotatable arm member 82 through an opening in the block member 83, thereby intermittently breaking the circuit in the block member 83 and generating the signal. A tachometer generator 62 actuated synchronously with impulse contactor 61, receives the signal reflected in the shaft 57 by means of the belt means 72, 72a and 72b. Thus, the signal from the upper belt 32 (which is generated by and directly related to the movement of the cable C through the rotatable measuring unit 17) is transmitted to the measuring means 25 where it is converted into the desired measurements by the impulse contactor 61 and the tachometer generator 62.

Aside from the movement described above, the entire measuring unit 17 is rotated in the bearings 13 and 13' by conventional drive means connected to the rotatable measuring unit 17 from source such as drive shaft 14 and driver belt 15, so that the measuring procedure will not interfere with the movement of the cable through the machine and the stranding operation being conducted on the cable. Rotation of the entire rotatable measuring unit enables application of a minimum and constant pressure such as not to distort, damage, or interfere with the cable. In order to counteract the effects of, and make the system insensitive to, centrifugal force in the rotation of the rotating measuring unit, as would in conventional devices cause variation of pressure on the cable the measuring belt system is individually pivoted and properly counterbalanced. The two upper pulleys 31 and 31' straddle and are pivoted (FIG. 3) in the central frame member 41 on upper pivots 42 and 42' (FIGS. 1 and 2) and the two lower pulleys 33 and 33' straddle and are pivoted on lower pivots 43 and 43'. In turn, the central frame member 41 is balanced as by pivots 52 and 52' on the housing member 21 (FIG. 3) by the upper housing and the lower housing pivots at (FIG. 2) 53 and 53'. Aside from this pivoting, counterbalancing is obtained by adjustable placement of the upper balance weight 63 on upper balance arm 47 (FIG. 2) and the lower balance weight 64 on lower balance arm 49. The pivoting and counterbalancing arrangement assures that, regardless of the diameter of the cable, the belts will always assume parallel positions along the wire centerline and will not be affected by centrifugal force.

The slipring 70 and the slipring brush 71 (FIG. 1) facilitate transmission of the measuring signal from the impulse contactor 61 and the cable speed signal from the impulse contactor 61 and the cable speed signal from the tachometer generator 62 to remote metering devices. When such rotatable measuring unit 17 is rotated in synchronism with the rotating unit in the stranger line which is imparting the twist onto the cable, the measuring device has no influence on the natural twist or lay being introduced into the cable. Similarly, the rotatable measuring unit 17 may be rotated at one-half the speed of the rotating unit in the stranger line, to have the effect of putting a double twist in the cable.

While the foregoing disclosure of exemplary embodiments is made in accordance with the patent statutes, it is to be understood that the invention is not to be limited thereto or thereby, the inventive scope being defined in the appended claims.

I claim:

1. A measuring machine for measurement of a cable comprising:
   a. means for guiding the cable for movement through the machine in a given axial plane, comprising hollow bearing members in said machine through which said cables so pass, and
   b. means rotatably mounted in the machine with relation to said longitudinal axial plane and in contact with the said cable so passing through the machine for measurement of the cable passing in a given plane through the machine, comprising:
      i. a housing member,
      ii. a plurality of belt means, for yieldably and movably contacting and following said cable so as to generate a signal thereby, related to the speed of the cable, said plurality of belt means comprising an upper belt member and a lower belt member,
      iii. support means for supporting said belt means in generally parallel relationship to each other, comprising counterbalancing means for counterbalancing same during rotational movement of said rotatable measuring unit about said cable, and pivoting means for pivotal support of said plurality of belt means, comprising a central frame member, and pivot means, for pivotal support of said central frame member in said housing member,
      iv. connection means, for interconnecting said belt means to said measuring means, comprising a connector shaft, first connector means, connected between said upper belt member and said connector shaft, and second connector means, connected between said connector shaft and said measuring means, and
      v. measuring means, for receiving the signal generated by movement of said belt means and converting same into measured units, comprising: a tachometer generator for providing a voltage signal which varies with changing cable speed, connected to said connector means, and an impulse contactor, for providing an electrical signal representing the length of cable passing through the machine, also connected to said second connector means.

2. In a measuring machine as set forth in claim 1, said central frame member comprising:
   an upper central member,
   a lower central member,
   connectors interconnecting said upper central member and said lower central member, and
   arm support means.

3. In a measuring machine as set forth in claim 2, said arm support means comprising:
   upper outer frame arms, extending from one face of said upper central member,
   lower outer frame arms extending from one face of said lower central member,
   upper balance arm extending from the other face of said upper central member,
   lower balance arm extending from the other face of said lower central member,
   upper inner frame arms, supporting said upper belt member,
   lower inner frame arms, supporting said lower belt member,
   upper pivots, for pivotally connecting said upper inner frame arms with said upper outer frame arms, and
   lower pivots for pivotally connecting said lower inner frame arms with said lower outer frame arms.

4. In a measuring machine as set forth in claim 3, said pivot means of said pivoted support means comprising upper housing pivots, extending from the sides of said upper belt member onto said housing member and lower housing pivots extending from the sides of said lower belt member onto said housing member.

5. In a measuring machine as set forth in claim 4, said connectors comprising:
   bolt members having threaded portions, and
   spring members about said bolt members.

6. In a measuring machine as set forth in claim 5, said central frame member counterbalancing means further comprising upper balance weight, positioned on said upper balance arm, and lower balance weight, positioned on said lower balance arm.

7. In a measuring machine as set forth in claim 6, said rotatable measuring unit further comprising gear segments on said upper belt member and said lower belt member, to insure equal and uniform movement of said upper belt member and lower belt member relative to the cable centerline.

8. In a measuring machine as set forth in claim 7, said bearing means further comprising a slipring and said support member further comprising a slipring brush, for regulation of the rotating speed of said rotating measuring means.

9. In a measuring machine for measurement of an axially elongated member moving therethrough:
 a. guide means for guiding said axially elongated member through said machine in a given axial plane, and
 b. measuring means, for measurement of said axially elongated member, comprising:
  i. a housing member, rotatably mounted in said measuring machine,
  ii. endless belt means, pivotally mounted in said housing member, supported in generally parallel relationship to each other so as to provide a space therebetween for movement of said axially elongated member therethrough, and generating measurements by movement of said axially elongated member thereagainst causing movement thereof,
  iii. counterbalancing means, weighted to counterbalance said endless belt means on rotation thereof with said housing member in said measuring machine, and tensioned to urge each of said endless belt means with respect to the other, and
  iv. conversion means, for converting the movement of said endless belt means into a signal which yields a reading in measured units on a scale as desired, each of said endless belt means further comprising:
  c. pulley member,
  d. an endless belt member, extending about said pulley members,
  e. an outer frame member,
  f. first pivots connecting said outer frame member with said inner frame member, and
  g. second pivots connecting said outer frame member with said housing member, whereby pivotal movement is facilitated between said inner frame member and said outer frame member, and between said outer frame member and said housing member, enabling said endless belt means to contact the irregular surface of said axially elongated member moving thereagainst to average same out of the conversion means.

10. In a measuring machine as set forth in claim 9, said counterbalancing means comprising:
 a central frame member, said outer frame member extending from one face thereof,
 a counterbalance arm member, extending from the other face of said central frame member,
 a weight, borne on said counterbalance arm member, positioned thereon to balance said endless belt means on said outer frame member, and
 spring tension means, positioned between said counterbalance arm member and a corresponding counterbalance arm ember for the other of said endless belt means.

11. In a measuring machine as set forth in claim 10, said guide means comprising hollow bearing means.